United States Patent
Gusak (10) Patent No.: US 10,430,332 B2
(45) Date of Patent: Oct. 1, 2019

(54) SYSTEM AND METHOD FOR PERFORMANCE TUNING OF GARBAGE COLLECTION ALGORITHMS

(71) Applicant: salesforce.com, inc., San Francisco, CA (US)

(72) Inventor: Oleg Gusak, Pleasant Hill, CA (US)

(73) Assignee: salesforce.com, inc., San Francisco, CA (US)

(*) Notice: Subject to any disclaimer, the term of this patent is extended or adjusted under 35 U.S.C. 154(b) by 584 days.

(21) Appl. No.: 14/224,293

(22) Filed: Mar. 25, 2014

(65) Prior Publication Data

US 2014/0289286 A1    Sep. 25, 2014

Related U.S. Application Data (60) Provisional application No. 61/804,913, filed on Mar. 25, 2013.

(51) Int. Cl.
*G06F 12/02* (2006.01)
*G06F 16/23* (2019.01)

(52) U.S. Cl.
CPC ...... *G06F 12/0253* (2013.01); *G06F 16/2308* (2019.01)

(58) Field of Classification Search
None
See application file for complete search history.

(56) References Cited

U.S. PATENT DOCUMENTS

| | | |
|---|---|---|
| 5,577,188 A | 11/1996 | Zhu |
| 5,608,872 A | 3/1997 | Schwartz et al. |
| 5,649,104 A | 7/1997 | Carleton et al. |
| 5,715,450 A | 2/1998 | Ambrose et al. |
| 5,761,419 A | 6/1998 | Schwartz et al. |
| 5,819,038 A | 10/1998 | Carleton et al. |
| 5,821,937 A | 10/1998 | Tonelli et al. |
| 5,831,610 A | 11/1998 | Tonelli et al. |
| 5,873,096 A | 2/1999 | Lim et al. |
| 5,918,159 A | 6/1999 | Fomukong et al. |
| 5,963,953 A | 10/1999 | Cram et al. |
| 6,092,083 A | 7/2000 | Brodersen et al. |
| 6,161,149 A | 12/2000 | Achacoso et al. |
| 6,169,534 B1 | 1/2001 | Raffel et al. |
| 6,178,425 B1 | 1/2001 | Brodersen et al. |
| 6,189,011 B1 | 2/2001 | Lim et al. |

(Continued)

OTHER PUBLICATIONS

Daniel Mosse, Aug. 2003, http://ieeexplore.ieee.org/stamp/stamp.jsp?arnumber=1223648&tag=1.*

*Primary Examiner* — Matthew J Ellis (74) *Attorney, Agent, or Firm* — Lorenz & Kopf, LLP (57) ABSTRACT

Methods and apparatus are provided for tuning a garbage collection algorithm. The apparatus includes a request generator configured to generate a transaction request including parameters Ta, Te, and M, where Ta represents a transaction request inter-arrival time, Te represents a transaction request execution time, and M represents a transaction request memory allocation amount. The apparatus also includes a memory allocation module, an active request queue, and a garbage collection (GC) module. The memory allocation module is configured to admit the formatted transaction request to the queue if at least M heap memory is available, and to initiate a GC routine if M heap memory is not available.

16 Claims, 4 Drawing Sheets

(56) References Cited

U.S. PATENT DOCUMENTS

| | | |
|---|---|---|
| 6,216,135 B1 | 4/2001 | Brodersen et al. |
| 6,233,617 B1 | 5/2001 | Rothwein et al. |
| 6,266,669 B1 | 7/2001 | Brodersen et al. |
| 6,295,530 B1 | 9/2001 | Ritchie et al. |
| 6,324,568 B1 | 11/2001 | Diec et al. |
| 6,324,693 B1 | 11/2001 | Brodersen et al. |
| 6,336,137 B1 | 1/2002 | Lee et al. |
| D454,139 S | 3/2002 | Feldcamp et al. |
| 6,367,077 B1 | 4/2002 | Brodersen et al. |
| 6,393,605 B1 | 5/2002 | Loomans |
| 6,405,220 B1 | 6/2002 | Brodersen et al. |
| 6,434,550 B1 | 8/2002 | Warner et al. |
| 6,446,089 B1 | 9/2002 | Brodersen et al. |
| 6,535,909 B1 | 3/2003 | Rust |
| 6,549,908 B1 | 4/2003 | Loomans |
| 6,553,563 B2 | 4/2003 | Ambrose et al. |
| 6,560,461 B1 | 5/2003 | Fomukong et al. |
| 6,574,635 B2 | 6/2003 | Stauber et al. |
| 6,577,726 B1 | 6/2003 | Huang et al. |
| 6,601,087 B1 | 7/2003 | Zhu et al. |
| 6,604,117 B2 | 8/2003 | Lim et al. |
| 6,604,128 B2 | 8/2003 | Diec |
| 6,609,150 B2 | 8/2003 | Lee et al. |
| 6,621,834 B1 | 9/2003 | Scherpbier et al. |
| 6,654,032 B1 | 11/2003 | Zhu et al. |
| 6,665,648 B2 | 12/2003 | Brodersen et al. |
| 6,665,655 B1 | 12/2003 | Warner et al. |
| 6,684,438 B2 | 2/2004 | Brodersen et al. |
| 6,711,565 B1 | 3/2004 | Subramaniam et al. |
| 6,724,399 B1 | 4/2004 | Katchour et al. |
| 6,728,702 B1 | 4/2004 | Subramaniam et al. |
| 6,728,960 B1 | 4/2004 | Loomans et al. |
| 6,732,095 B1 | 5/2004 | Warshavsky et al. |
| 6,732,100 B1 | 5/2004 | Brodersen et al. |
| 6,732,111 B2 | 5/2004 | Brodersen et al. |
| 6,754,681 B2 | 6/2004 | Brodersen et al. |
| 6,763,351 B1 | 7/2004 | Subramaniam et al. |
| 6,763,501 B1 | 7/2004 | Zhu et al. |
| 6,768,904 B2 | 7/2004 | Kim |
| 6,772,229 B1 | 8/2004 | Achacoso et al. |
| 6,782,383 B2 | 8/2004 | Subramaniam et al. |
| 6,804,330 B1 | 10/2004 | Jones et al. |
| 6,826,565 B2 | 11/2004 | Ritchie et al. |
| 6,826,582 B1 | 11/2004 | Chatterjee et al. |
| 6,826,745 B2 | 11/2004 | Coker |
| 6,829,655 B1 | 12/2004 | Huang et al. |
| 6,842,748 B1 | 1/2005 | Warner et al. |
| 6,850,895 B2 | 2/2005 | Brodersen et al. |
| 6,850,949 B2 | 2/2005 | Warner et al. |
| 7,062,502 B1 | 6/2006 | Kesler |
| 7,181,758 B1 | 2/2007 | Chan |
| 7,340,411 B2 | 3/2008 | Cook |
| 7,356,482 B2 | 4/2008 | Frankland et al. |
| 7,401,094 B1 | 7/2008 | Kesler |
| 7,412,455 B2 | 8/2008 | Dillon |
| 7,508,789 B2 | 3/2009 | Chan |
| 7,620,655 B2 | 11/2009 | Larsson et al. |
| 7,698,160 B2 | 4/2010 | Beaven et al. |
| 8,015,495 B2 | 9/2011 | Achacoso et al. |
| 8,082,301 B2 | 12/2011 | Ahlgren et al. |
| 8,095,413 B1 | 1/2012 | Beaven |
| 8,095,594 B2 | 1/2012 | Beaven et al. |
| 8,275,836 B2 | 9/2012 | Beaven et al. |
| 8,457,545 B2 | 6/2013 | Chan |
| 8,484,111 B2 | 7/2013 | Frankland et al. |
| 8,583,783 B1 * | 11/2013 | Hayward ............ G06F 12/0253 707/813 |
| 2001/0044791 A1 | 11/2001 | Richter et al. |
| 2002/0072951 A1 | 6/2002 | Lee et al. |
| 2002/0078002 A1 * | 6/2002 | Bottomley .......... G06F 12/0269 |
| 2002/0082892 A1 | 6/2002 | Raffel |
| 2002/0129352 A1 | 9/2002 | Brodersen et al. |
| 2002/0140731 A1 | 10/2002 | Subramanian et al. |
| 2002/0143997 A1 | 10/2002 | Huang et al. |
| 2002/0162090 A1 | 10/2002 | Parnell et al. |
| 2002/0165742 A1 | 11/2002 | Robbins |
| 2003/0004971 A1 | 1/2003 | Gong |
| 2003/0018705 A1 | 1/2003 | Chen et al. |
| 2003/0018830 A1 | 1/2003 | Chen et al. |
| 2003/0066031 A1 | 4/2003 | Laane et al. |
| 2003/0066032 A1 | 4/2003 | Ramachandran et al. |
| 2003/0069936 A1 | 4/2003 | Warner et al. |
| 2003/0070000 A1 | 4/2003 | Coker et al. |
| 2003/0070004 A1 | 4/2003 | Mukundan et al. |
| 2003/0070005 A1 | 4/2003 | Mukundan et al. |
| 2003/0074418 A1 | 4/2003 | Coker et al. |
| 2003/0120675 A1 | 6/2003 | Stauber et al. |
| 2003/0151633 A1 | 8/2003 | George et al. |
| 2003/0159136 A1 | 8/2003 | Huang et al. |
| 2003/0187921 A1 | 10/2003 | Diec et al. |
| 2003/0189600 A1 | 10/2003 | Gune et al. |
| 2003/0204427 A1 | 10/2003 | Gune et al. |
| 2003/0206192 A1 | 11/2003 | Chen et al. |
| 2003/0210658 A1 * | 11/2003 | Hernandez ........ H04W 52/0232 370/311 |
| 2003/0225730 A1 | 12/2003 | Warner et al. |
| 2004/0001092 A1 | 1/2004 | Rothwein et al. |
| 2004/0010489 A1 | 1/2004 | Rio et al. |
| 2004/0015981 A1 | 1/2004 | Coker et al. |
| 2004/0024988 A1 * | 2/2004 | Chauvel .............. G06F 9/30174 712/34 |
| 2004/0027388 A1 | 2/2004 | Berg et al. |
| 2004/0128001 A1 | 7/2004 | Levin et al. |
| 2004/0186860 A1 | 9/2004 | Lee et al. |
| 2004/0193510 A1 | 9/2004 | Catahan et al. |
| 2004/0199489 A1 | 10/2004 | Barnes-Leon et al. |
| 2004/0199536 A1 | 10/2004 | Barnes-Leon et al. |
| 2004/0199543 A1 | 10/2004 | Braud et al. |
| 2004/0249854 A1 | 12/2004 | Barnes-Leon et al. |
| 2004/0260534 A1 | 12/2004 | Pak et al. |
| 2004/0260659 A1 | 12/2004 | Chan et al. |
| 2004/0268299 A1 | 12/2004 | Lei et al. |
| 2005/0050555 A1 | 3/2005 | Exley et al. |
| 2005/0091098 A1 | 4/2005 | Brodersen et al. |
| 2005/0160416 A1 * | 7/2005 | Jamison ............... G06F 12/0253 717/154 |
| 2006/0021019 A1 | 1/2006 | Hinton et al. |
| 2006/0230087 A1 * | 10/2006 | Andreasson ........ G06F 12/0253 |
| 2007/0234297 A1 * | 10/2007 | Zorn ................... G06F 11/3612 717/124 |
| 2007/0260843 A1 * | 11/2007 | Creamer ............. G06F 11/3428 711/170 |
| 2008/0172431 A1 * | 7/2008 | Stephens ............. G06F 12/0253 |
| 2008/0249972 A1 | 10/2008 | Dillon |
| 2009/0063414 A1 | 3/2009 | White et al. |
| 2011/0047084 A1 * | 2/2011 | Manzalini ............... G06F 9/505 705/301 |
| 2011/0252075 A1 * | 10/2011 | Ylonen .................. G06F 9/522 707/818 |
| 2012/0259894 A1 * | 10/2012 | Varley ............... G06F 17/30575 707/795 |
| 2012/0304172 A1 * | 11/2012 | Greifeneder ........ G06F 9/45504 718/1 |
| 2013/0212064 A1 * | 8/2013 | Mahmoud ......... G06F 17/30306 707/609 |

* cited by examiner

SYSTEM AND METHOD FOR PERFORMANCE TUNING OF GARBAGE COLLECTION ALGORITHMS

CROSS-REFERENCE TO RELATED APPLICATION

This application claims the benefit of U.S. provisional patent application Ser. No. 61/804,913, filed Mar. 25, 2013, the entire content of which is incorporated by reference herein.

TECHNICAL FIELD

Embodiments of the subject matter described herein relate generally to techniques for managing memory allocation and, more particularly, to computer systems and applications for tuning the performance of garbage collection processes.

BACKGROUND

Modern software development is evolving away from the client-server model toward network-based processing systems that provide access to data and services via the Internet or other networks. In contrast to traditional systems that host networked applications on dedicated server hardware, a "cloud" computing model allows applications to be provided over the network "as a service" supplied by an infrastructure provider. The infrastructure provider typically abstracts the underlying hardware and other resources used to deliver a customer-developed application so that the customer no longer needs to operate and support dedicated server hardware. The cloud computing model can often provide substantial cost savings to the customer over the life of the application because the customer no longer needs to provide dedicated network infrastructure, electrical and temperature controls, physical security and other logistics in support of dedicated server hardware.

Multi-tenant cloud-based architectures have been developed to improve collaboration, integration, and community-based cooperation between customer tenants without sacrificing data security. Generally speaking, multi-tenancy refers to a system where a single hardware and software platform simultaneously supports multiple user groups (also referred to as "organizations" or "tenants") from a common data storage element (also referred to as a "multi-tenant database"). The multi-tenant design provides a number of advantages over conventional server virtualization systems. First, the multi-tenant platform operator can often make improvements to the platform based upon collective information from the entire tenant community. Additionally, because all users in the multi-tenant environment execute applications within a common processing space, it is relatively easy to grant or deny access to specific sets of data for any user within the multi-tenant platform, thereby improving collaboration and integration between applications and the data managed by the various applications. The multi-tenant architecture therefore allows convenient and cost effective sharing of similar application features between multiple sets of users.

Robust virtual machines and algorithms for de-allocating expired data objects (collecting garbage) of applications executed on the virtual machine have been developed for use in both stand alone and multi-tenant environments. Presently known garbage collection algorithms have the ability to interrupt application processing as necessary to ensure the availability of memory when needed by the application. However, suspending an application can be disruptive for the user, particularly in a time sensitive context such as an on-line transaction processing (OLTP) environment Systems and methods are thus needed for minimizing the impact of pausing applications in a garbage collection environment.

BRIEF DESCRIPTION OF THE DRAWING FIGURES

A more complete understanding of the subject matter may be derived by referring to the detailed description and claims when considered in conjunction with the following figures, wherein like reference numbers refer to similar elements throughout the figures.

DETAILED DESCRIPTION

Embodiments of the subject matter described herein generally relate to computer systems and applications for tuning the performance of garbage collection processes.

Systems and methods are provided for testing and implementing a garbage collection (GC) routine. In an embodiment, a GC simulation model includes a request generator configured to generate a transaction request including parameters $T_a$, $T_e$, and M, where $T_a$ represents a transaction request inter-arrival time, $T_e$ represents a transaction request execution time, and M represents a transaction request memory allocation amount. The simulation model may also include a memory allocation module; an active request queue; and a garbage collection (GC) module; wherein the memory allocation module is configured to admit the formatted transaction request to the queue if at least M heap memory is available, and to initiate a GC routine if M heap memory is not available.

The simulation model may also include a central processing unit (CPU) module configured to process active transaction requests received from the queue, and the CPU module may contain a plurality of processing cores, each configured to serially process a respective transaction request thread.

In an embodiment, the request generator is configured to generate respective transaction requests at periodic rate of $(1/T_a)$, the queue is configured to maintain a plurality of active transaction requests awaiting processing by the CPU module, and the garbage collector module is configured to interrupt processing of an active transaction request during a GC routine.

In an embodiment, the garbage collection module is further configured to resume processing of the interrupted transaction request upon completion of a GC routine.

In an embodiment, the memory allocation module is further configured to record a GC completion time $T_{gc}$, and to adjust $T_e$ by $T_{gc}$ for the transaction request interrupted by a GC routine.

In an embodiment the simulation model may be configured for use in an on-line transaction processing (OLTP) environment.

In a further embodiment, the request generator may be implemented in the form of a discrete event simulator, where $T_a$, $T_e$, and M are random variables modeled using probability distributions, which may be derived from historical data.

In an embodiment, the simulation model may be configured to mark as garbage the memory associated with a transaction request when processing the transaction request is completed.

In an embodiment, the simulation model may be configured for use in an on-demand, multitenant computing environment.

In an embodiment, the simulation model may be implemented using computer code embodied in a non-transitory computer readable medium.

A state machine is also provided for implementing a request execution process in the context of a garbage collection virtual machine which includes the steps of: receiving a request of the form $R(T_e, M)$, where $T_e$ represents an execution time and M represents a memory allocation amount; determining an amount of available heap memory; allocating an amount M of heap memory to the request; adding the request to an active request pool; if the request is not interrupted by a GC routine, completing the request in a first time $T_e$; and if the request is interrupted by a GC routine: i) identifying a time $T_{gc}$ associated with the interrupting GC routine; and ii) completing the request in a second time $T_e+T_{gc}$.

In an embodiment the state machine may also check, in response to receiving and prior to determining, the state of a garbage collection (GC) routine.

In an embodiment the state machine may also wait, if the GC routine is active, until the active GC routine is completed before determining; and if the GC routine is not active, determine the amount of available heap memory.

In an embodiment the state machine may also, in response to determining the amount of available heap memory: trigger a GC routine if the amount of available heap memory is less than M; and allocate an amount M of heap memory to the request if the amount of available heap memory is not less than M.

In a further embodiment, adding the request to the active request pool involves starting an execution clock T associated with the request.

In an embodiment the state machine may also set $T=T_e$ for the request if the request processing is not interrupted by a GC; and if processing the request is interrupted by a GC routine, identify a time $T_{gc}$ associated with the interrupting GC routine and set $T=T_e+T_{gc}$ for a request if the request processing is interrupted by the GC routine.

In an embodiment the state machine may also be configured to interrupt all active transaction request processing upon triggering a GC routine.

An on-demand, multitenant computing system is also provided for processing on-line transaction requests. The system may include: a request generator configured to generate a transaction request including parameters $T_e$, and M, where $T_e$ represents a transaction request execution time and M represents a transaction request memory allocation amount; a memory allocation module; an active request queue; and a garbage collection (GC) module; wherein the memory allocation module is configured to apply the formatted transaction request to the queue if at least M heap memory is available, and to initiate a GC routine if M heap memory is not available; and further wherein the system is configured to: i) complete the transaction request in a first time $T_e$ if the transaction request is not interrupted by a GC routine; and ii) if the request is interrupted by a GC routine, identify a time $T_{gc}$ associated with the interrupting GC routine and complete the request in a second time $T_e+T_{gc}$.

Figure 1:
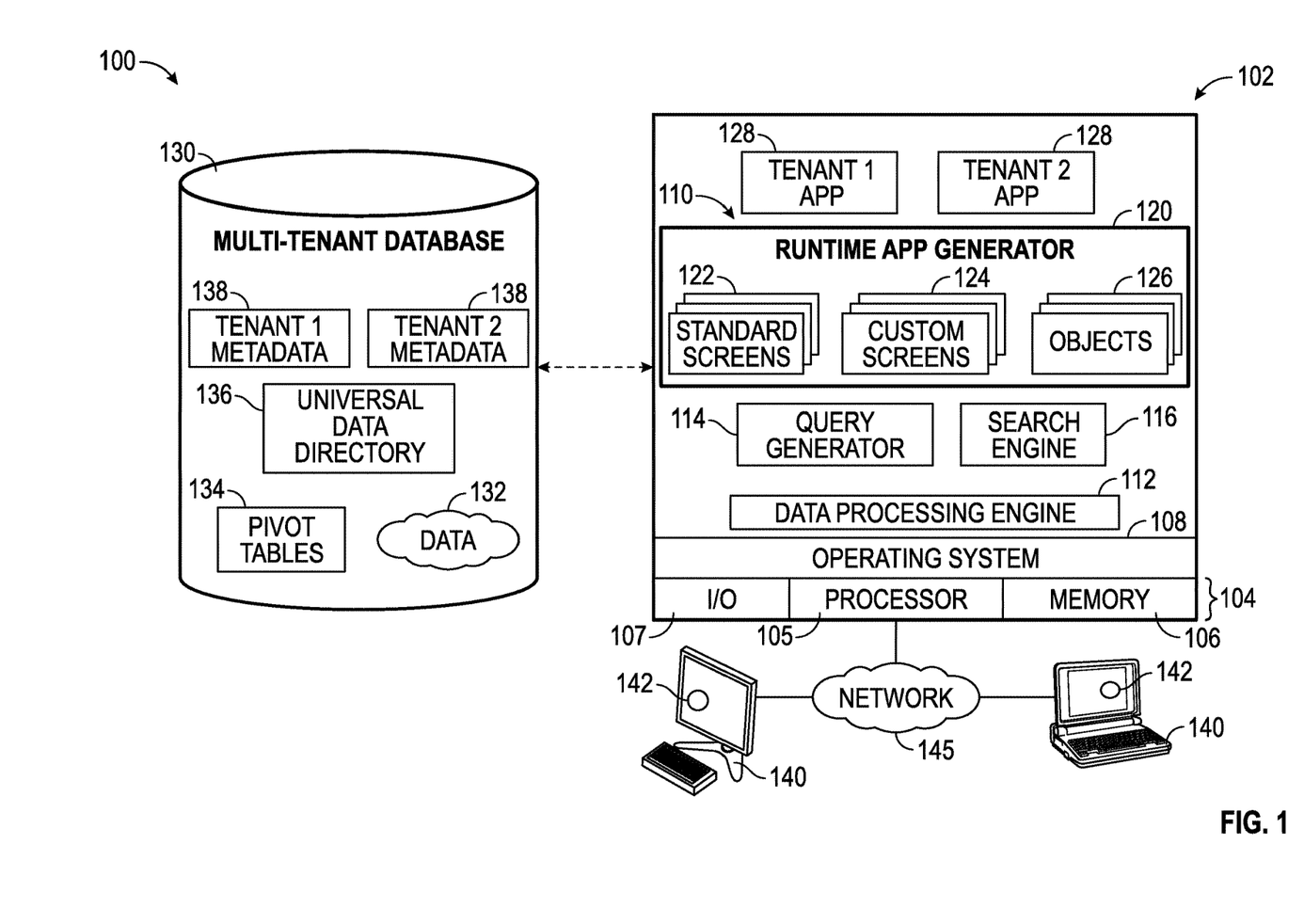
FIG. 1 is a schematic block diagram of a multi-tenant computing environment in accordance with an exemplary embodiment.

Turning now to FIG. 1, an exemplary multi-tenant system 100 includes a server 102 that dynamically creates and supports virtual applications 128 based upon data 132 from a database 130 that may be shared between multiple tenants, referred to herein as a multi-tenant database. Data and services generated by the virtual applications 128 are provided via a network 145 to any number of client devices 140, as desired. Each virtual application 128 is suitably generated at run-time (or on-demand) using a common application platform 110 that securely provides access to the data 132 in the database 130 for each of the various tenants subscribing to the multi-tenant system 100. In accordance with one non-limiting example, the multi-tenant system 100 is implemented in the form of an on-demand multi-tenant customer relationship management (CRM) system that can support any number of authenticated users of multiple tenants.

As used herein, a "tenant" or an "organization" should be understood as referring to a group of one or more users that shares access to common subset of the data within the multi-tenant database 130. In this regard, each tenant includes one or more users associated with, assigned to, or otherwise belonging to that respective tenant. Stated another way, each respective user within the multi-tenant system 100 is associated with, assigned to, or otherwise belongs to a particular one of the plurality of tenants supported by the multi-tenant system 100. Tenants may represent companies, corporate departments, business or legal organizations, and/or any other entities that maintain data for particular sets of users (such as their respective customers) within the multi-tenant system 100. Although multiple tenants may share access to the server 102 and the database 130, the particular data and services provided from the server 102 to each tenant can be securely isolated from those provided to other tenants. The multi-tenant architecture therefore allows different sets of users to share functionality and hardware resources without necessarily sharing any of the data 132 belonging to or otherwise associated with other tenants.

The multi-tenant database 130 may be a repository or other data storage system capable of storing and managing the data 132 associated with any number of tenants. The database 130 may be implemented using conventional database server hardware. In various embodiments, the database 130 shares processing hardware 104 with the server 102. In other embodiments, the database 130 is implemented using separate physical and/or virtual database server hardware that communicates with the server 102 to perform the various functions described herein. In an exemplary embodiment, the database 130 includes a database management system or other equivalent software capable of determining an optimal query plan for retrieving and providing a particular subset of the data 132 to an instance of virtual application 128 in response to a query initiated or otherwise provided by a virtual application 128, as described in greater detail below. The multi-tenant database 130 may alternatively be referred to herein as an on-demand database, in that the multi-tenant database 130 provides (or is available to provide) data at run-time to on-demand virtual applications 128 generated by the application platform 110, as described in greater detail below.

In practice, the data 132 may be organized and formatted in any manner to support the application platform 110. In various embodiments, the data 132 is suitably organized into a relatively small number of large data tables to maintain a semi-amorphous "heap"-type format. The data 132 can then be organized as needed for a particular virtual application 128. In various embodiments, conventional data relationships are established using any number of pivot tables 134 that establish indexing, uniqueness, relationships between entities, and/or other aspects of conventional database organization as desired. Further data manipulation and report formatting is generally performed at run-time using a variety of metadata constructs. Metadata within a universal data directory (UDD) 136, for example, can be used to describe any number of forms, reports, workflows, user access privileges, business logic and other constructs that are common to multiple tenants. Tenant-specific formatting, functions and other constructs may be maintained as tenant-specific metadata 138 for each tenant, as desired. Rather than forcing the data 132 into an inflexible global structure that is common to all tenants and applications, the database 130 is organized to be relatively amorphous, with the pivot tables 134 and the metadata 138 providing additional structure on an as-needed basis. To that end, the application platform 110 suitably uses the pivot tables 134 and/or the metadata 138 to generate "virtual" components of the virtual applications 128 to logically obtain, process, and present the relatively amorphous data 132 from the database 130.

The server 102 may be implemented using one or more actual and/or virtual computing systems that collectively provide the dynamic application platform 110 for generating the virtual applications 128. For example, the server 102 may be implemented using a cluster of actual and/or virtual servers operating in conjunction with each other, typically in association with conventional network communications, cluster management, load balancing and other features as appropriate. The server 102 operates with any sort of conventional processing hardware 104, such as a processor 105, memory 106, input/output features 107 and the like. The input/output features 107 generally represent the interface(s) to networks (e.g., to the network 145, or any other local area, wide area or other network), mass storage, display devices, data entry devices and/or the like. The processor 105 may be implemented using any suitable processing system, such as one or more processors, controllers, microprocessors, microcontrollers, processing cores and/or other computing resources spread across any number of distributed or integrated systems, including any number of "cloud-based" or other virtual systems. The memory 106 represents any non-transitory short or long term storage or other computer-readable media capable of storing programming instructions for execution on the processor 105, including any sort of random access memory (RAM), read only memory (ROM), flash memory, magnetic or optical mass storage, and/or the like. The computer-executable programming instructions, when read and executed by the server 102 and/or processor 105, cause the server 102 and/or processor 105 to create, generate, or otherwise facilitate the application platform 110 and/or virtual applications 128 and perform one or more additional tasks, operations, functions, and/or processes described herein. It should be noted that the memory 106 represents one suitable implementation of such computer-readable media, and alternatively or additionally, the server 102 could receive and cooperate with external computer-readable media that is realized as a portable or mobile component or platform, e.g., a portable hard drive, a USB flash drive, an optical disc, or the like.

The application platform 110 is any sort of software application or other data processing engine that generates the virtual applications 128 that provide data and/or services to the client devices 140. In a typical embodiment, the application platform 110 gains access to processing resources, communications interfaces and other features of the processing hardware 104 using any sort of conventional or proprietary operating system 108. The virtual applications 128 are typically generated at run-time in response to input received from the client devices 140. For the illustrated embodiment, the application platform 110 includes a bulk data processing engine 112, a query generator 114, a search engine 116 that provides text indexing and other search functionality, and a runtime application generator 120. Each of these features may be implemented as a separate process or other module, and many equivalent embodiments could include different and/or additional features, components or other modules as desired.

The runtime application generator 120 dynamically builds and executes the virtual applications 128 in response to specific requests received from the client devices 140. The virtual applications 128 are typically constructed in accordance with the tenant-specific metadata 138, which describes the particular tables, reports, interfaces and/or other features of the particular application 128. In various embodiments, each virtual application 128 generates dynamic web content that can be served to a browser or other client program 142 associated with its client device 140, as appropriate.

The runtime application generator 120 suitably interacts with the query generator 114 to efficiently obtain multi-tenant data 132 from the database 130 as needed in response to input queries initiated or otherwise provided by users of the client devices 140. In a typical embodiment, the query generator 114 considers the identity of the user requesting a particular function (along with the user's associated tenant), and then builds and executes queries to the database 130 using system-wide metadata 136, tenant specific metadata 138, pivot tables 134, and/or any other available resources. The query generator 114 in this example therefore maintains security of the common database 130 by ensuring that queries are consistent with access privileges granted to the user and/or tenant that initiated the request.

With continued reference to FIG. 1, the data processing engine 112 performs bulk processing operations on the data 132 such as uploads or downloads, updates, online transaction processing, and/or the like. In many embodiments, less urgent bulk processing of the data 132 can be scheduled to occur as processing resources become available, thereby giving priority to more urgent data processing by the query generator 114, the search engine 116, the virtual applications 128, etc.

In exemplary embodiments, the application platform 110 is utilized to create and/or generate data-driven virtual applications 128 for the tenants that they support. Such virtual applications 128 may make use of interface features such as custom (or tenant-specific) screens 124, standard (or universal) screens 122 or the like. Any number of custom and/or standard objects 126 may also be available for integration into tenant-developed virtual applications 128. As used herein, "custom" should be understood as meaning that a respective object or application is tenant-specific (e.g., only available to users associated with a particular tenant in the multi-tenant system) or user-specific (e.g., only available to a particular subset of users within the multi-tenant system), whereas "standard" or "universal" applications or objects are available across multiple tenants in the multi-tenant system. The data 132 associated with each virtual application 128 is provided to the database 130, as appropriate, and stored until it is requested or is otherwise needed, along with the metadata 138 that describes the particular features (e.g., reports, tables, functions, objects, fields, formulas, code, etc.) of that particular virtual application 128. For example, a virtual application 128 may include a number of objects 126 accessible to a tenant, wherein for each object 126 accessible to the tenant, information pertaining to its object type along with values for various fields associated with that respective object type are maintained as metadata 138 in the database 130. In this regard, the object type defines the structure (e.g., the formatting, functions and other constructs) of each respective object 126 and the various fields associated therewith.

Still referring to FIG. 1, the data and services provided by the server 102 can be retrieved using any sort of personal computer, mobile telephone, tablet or other network-enabled client device 140 on the network 145. In an exemplary embodiment, the client device 140 includes a display device, such as a monitor, screen, or another conventional electronic display capable of graphically presenting data and/or information retrieved from the multi-tenant database 130, as described in greater detail below.

Typically, the user operates a conventional browser application or other client program 142 executed by the client device 140 to contact the server 102 via the network 145 using a networking protocol, such as the hypertext transport protocol (HTTP) or the like. The user typically authenticates his or her identity to the server 102 to obtain a session identifier ("SessionID") that identifies the user in subsequent communications with the server 102. When the identified user requests access to a virtual application 128, the runtime application generator 120 suitably creates the application at run time based upon the metadata 138, as appropriate.

As noted above, the virtual application 128 may contain Java, ActiveX, or other content that can be presented using conventional client software running on the client device 140; other embodiments may simply provide dynamic web or other content that can be presented and viewed by the user, as desired. As described in greater detail below, the query generator 114 suitably obtains the requested subsets of data 132 from the database 130 as needed to populate the tables, reports or other features of the particular virtual application 128.

Figure 2:
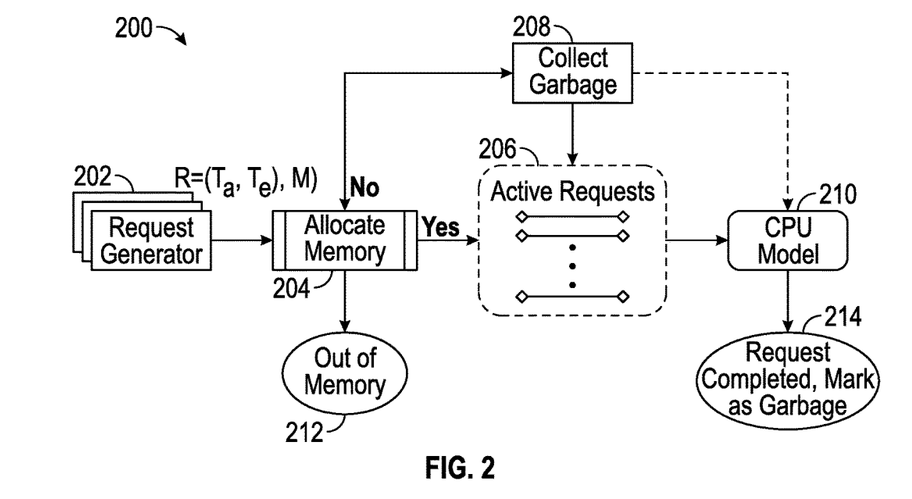
FIG. 2 is a schematic block diagram of a discrete event simulation model including a request generator, a garbage collection Java virtual machine (JVM), and a CPU model in accordance with an exemplary embodiment.

Referring now to FIG. 2, a discrete event simulation model 200 for use in testing and fine tuning garbage collection algorithms implemented in a java virtual machine (JVM). More particularly, the simulation model 200 includes a request generator module 202, a memory allocation module 204, an active request queue module 206, a garbage collection module 208, and a CPU model module 210.

The request generator module 202 formats user requests R using the following parameters:

$T_a$—request arrival time (inter-arrival)
$T_c$—CPU time required to execute transaction
M—amount of memory allocated by transaction The parameters $T_a$, $T_e$, and M are random variables that may be modeled using probability distributions based on, for example, actual historical data. An exponential distribution can be used to model the inter-arrival time $T_a$ of user transactions as well as the CPU time $T_c$. The amount of memory M allocated to a transaction may be modeled as a uniform distribution having minimum and maximum values.

In some implementations, describing different types of user transactions using different probability distributions and associated parameters and then generating transactions of each type separately during simulation can improve the accuracy of the model of the input load. Furthermore, the amount of memory allocated by the transaction can be broken into smaller chunks of memory allocated during the lifetime of a transaction:

$$M = (m_0, m1, \ldots m_n)$$

where $m_i = (m, m_{ta}, m_{tl})$, m represents the size of the allocated block of memory, $m_{ta}$ represents the time when the block is allocated, and $m_{tl}$ represents the lifetime of block of memory $m_i$ during which it is considered active (i.e., not garbage).

With continued reference to FIG. 2, once a request R is generated by the request generator module 202, the memory allocation module 204 considers the request for allocation on the heap of the virtual machine (VM). If there is enough memory currently available ("Yes" branch from module 204), the request can be added to the pool of active requests within the queue 206 to initiate processing. If, on the other hand, there is not enough memory available in the heap ("No" branch from module 204), the garbage collection process performed by the garbage collection module 208 may be triggered. The amount of time required to execute the garbage collection, $T_{gc}$, may also be modeled as a random variable and, in general, can depend on available CPU resources and heap size.

The execution of active requests may be interrupted or suspended while the garbage collection module 208 performs garbage collection. In other implementations of garbage collection algorithms, request processing may proceed concurrently with garbage collection. When the garbage collection process has freed up sufficient memory for the then current request, the request may be sent to the queue 206. If, however, insufficient memory is available even after the garbage collection process has completed, an "Out of Memory" flag 212 is set.

After the garbage collection algorithm completes its work, the execution of interrupted active requests may resume, and the total execution time associated with each request may be extended by the garbage collection time, $T_{gc}$, to account for the delay occasioned by the garbage collection.

After garbage collection completes, the memory allocation module 204 can attempt to allocate the incoming request again and if enough memory is available, the request can be added to the pool of active transactions (queue 206). If there is not enough memory available on the heap of the VM, the request can be discarded and memory error 212 logged.

Active requests can be executed either serially or in parallel by the CPU model 210. The execution time depends on $T_e$ of each request as well as CPU resources available (i.e., number of CPUs, CPU cores), number of active requests, and interruptions caused by garbage collection. Once a request is completed, the CPU model 210 marks the memory associated with the request as garbage to be collected in a subsequent garbage collection cycle (task 214).

Figure 3:
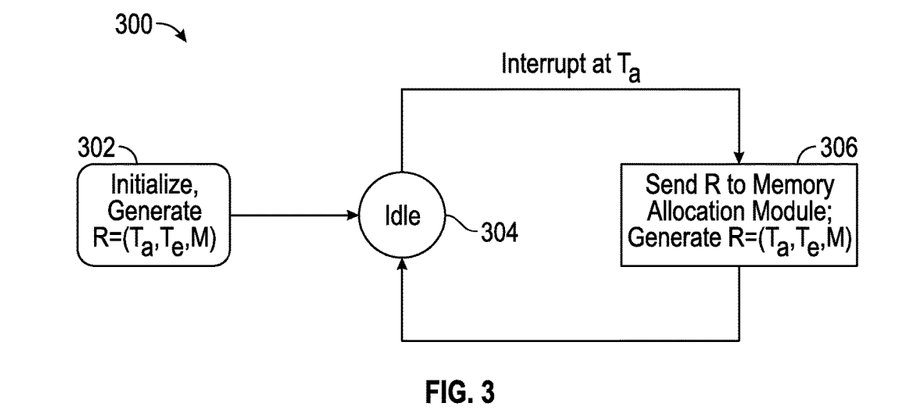
FIG. 3 is state machine diagram of the request generator of FIG. 2 in accordance with an exemplary embodiment.

FIG. 3 is state machine diagram 300 illustrating the operation of the request generator module 202 of FIG. 2. More particularly, the state machine is initialized in state 302 to define the format of the requests $R = (T_a, T_e, M)$ when the state machine initially enters the idle state 304. After time $T_a$, the process exits the idle state 304 and enters state 306, wherein it creates the request R with parameters $T_e$, M, and then generates values of parameters $T_a$, $T_e$, M of the next request using chosen probability distributions. The state machine 300 then transitions back to the idle state 304.

Figure 4:
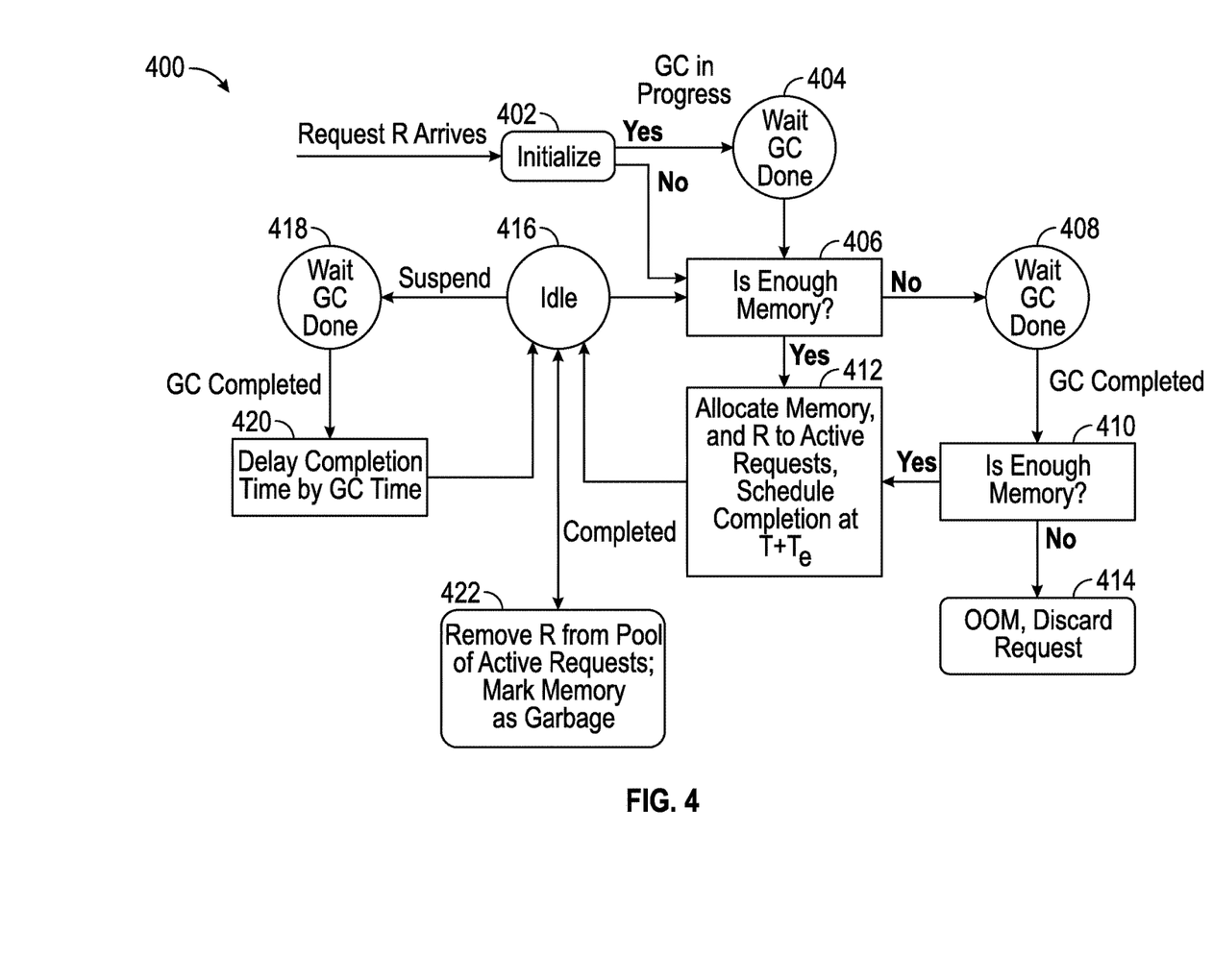
FIG. 4 is state machine diagram of request execution in the context of a garbage collection JVM in accordance with an exemplary embodiment.

Referring now to FIG. 4, a state machine diagram 400 illustrates an exemplary request execution process in the context of a garbage collection JVM. More particularly, upon arrival of a request, the request is initialized (state 402) and the state of the garbage collection process is checked. If a garbage collection is in progress ("Yes" branch from state 402), the generated request waits (404) until the garbage collection is completed.

When there is no active garbage collection or a garbage collection has been completed ("No" branch from state 402), the request can be added to the pool of active requests (state 406) and its execution clock started. If there is not enough space available in the heap ("No" branch from state 406), a garbage collection is triggered and the request waits until the garbage collection is completed (state 408).

When garbage collection is completed, the system determines if there is sufficient memory available (state 410). If sufficient memory is available ("Yes" branch from state 410), the request is allocated to the heap (state 412). If sufficient memory is not available ("No" branch from state 410), an out of memory error is generated (state 444) and the request discarded. Upon allocating a request to the queue (state 412), the system enters the idle state (state 416).

An active request can be interrupted ("Suspend" branch from idle state 416) and its execution time may be suspended (state 418) until the garbage collection is completed. When the garbage collection is completed, the delay time $T_{gc}$ attributable to garbage collection is added to the request execution time $T_e$ (state 420).

With continued reference to FIG. 4, when the execution time of a request expires, an event can be triggered from the idle state 416 to complete the request. When the request is completed ("Completed" branch from idle state 416), the request is removed from the queue (state 422) and the memory M allocated for request can be marked as garbage (state 422). The system may then return to the idle state 416.

Figure 5:
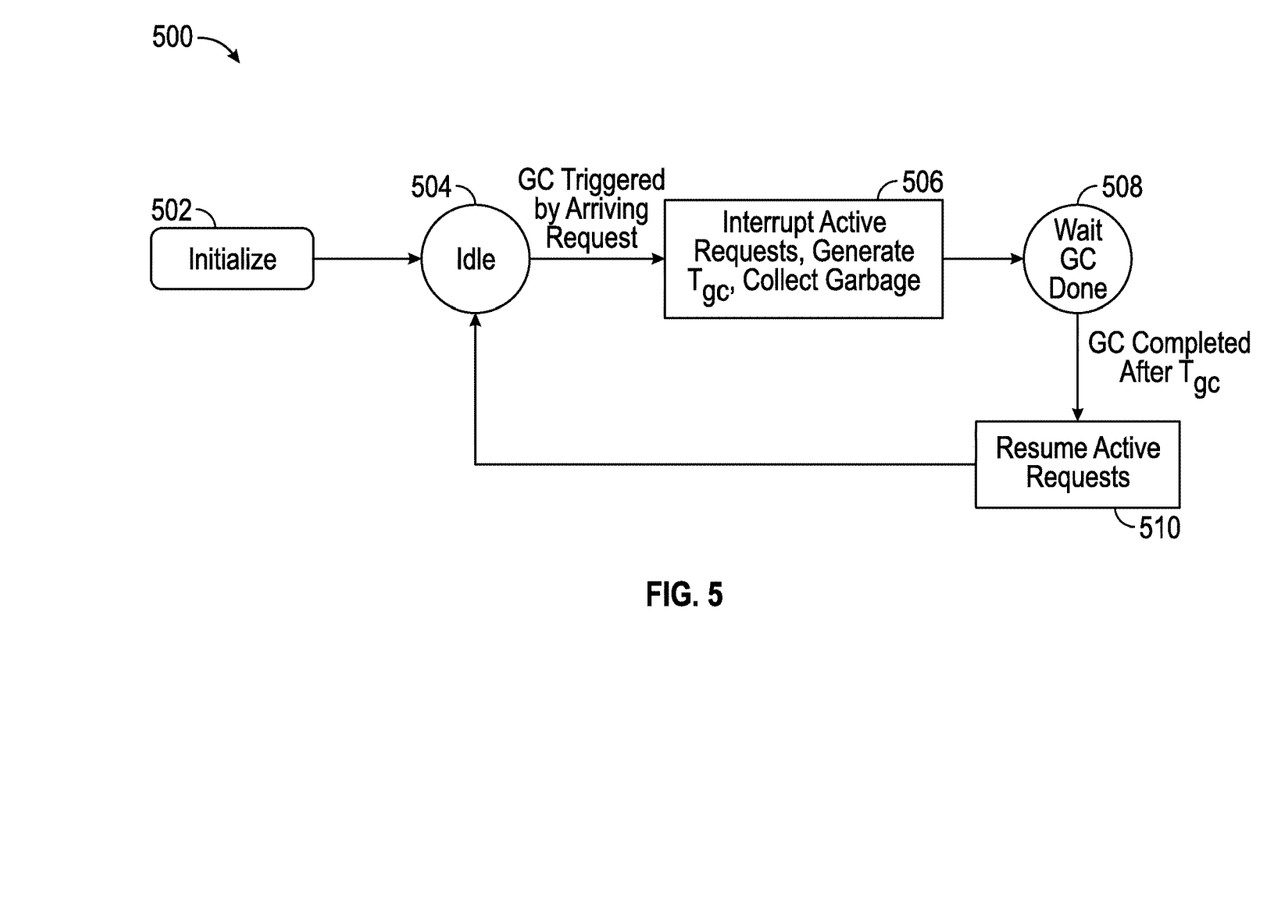
FIG. 5 is state machine diagram of a garbage collection process in accordance with an exemplary embodiment.

Turning now to FIG. 5, a state machine diagram 500 illustrates a garbage collection process. More particularly, following initialization (state 502), a garbage collection cycle can be triggered from the idle state (state 504) by an arriving transaction request when it tries to allocate more memory than is currently available. Upon triggering of a garbage collection cycle, the then currently active request(s) may be interrupted and the garbage collection time $T_{gc}$ recorded (state 506). Upon completion of the garbage collection cycle (state 508), active request processing resumes (state 510), following which the system transits to idle state (state 504) and waits for a signal to start new garbage collection cycle.

The foregoing description is merely illustrative in nature and is not intended to limit the embodiments of the subject matter or the application and uses of such embodiments. Furthermore, there is no intention to be bound by any expressed or implied theory presented in the technical field, background, or the detailed description. As used herein, the word "exemplary" means "serving as an example, instance, or illustration." Any implementation described herein as exemplary is not necessarily to be construed as preferred or advantageous over other implementations, and the exemplary embodiments described herein are not intended to limit the scope or applicability of the subject matter in any way.

For the sake of brevity, conventional techniques related to computer programming, computer networking, database querying, database statistics, query plan generation, XML and other functional aspects of the systems (and the individual operating components of the systems) may not be described in detail herein. In addition, those skilled in the art will appreciate that embodiments may be practiced in conjunction with any number of system and/or network architectures, data transmission protocols, and device configurations, and that the system described herein is merely one suitable example. Furthermore, certain terminology may be used herein for the purpose of reference only, and thus is not intended to be limiting. For example, the terms "first", "second" and other such numerical terms do not imply a sequence or order unless clearly indicated by the context.

Embodiments of the subject matter may be described herein in terms of functional and/or logical block components, and with reference to symbolic representations of operations, processing tasks, and functions that may be performed by various computing components or devices. Such operations, tasks, and functions are sometimes referred to as being computer-executed, computerized, software-implemented, or computer-implemented. In this regard, it should be appreciated that the various block components shown in the figures may be realized by any number of hardware, software, and/or firmware components configured to perform the specified functions. For example, an embodiment of a system or a component may employ various integrated circuit components, e.g., memory elements, digital signal processing elements, logic elements, look-up tables, or the like, which may carry out a variety of functions under the control of one or more microprocessors or other control devices. In this regard, the subject matter described herein can be implemented in the context of any computer-implemented system and/or in connection with two or more separate and distinct computer-implemented systems that cooperate and communicate with one another. That said, in exemplary embodiments, the subject matter described herein may be implemented in conjunction with a virtual customer relationship management (CRM) application in a multi-tenant environment.

While at least one exemplary embodiment has been presented in the foregoing detailed description, it should be appreciated that a vast number of variations exist. It should also be appreciated that the exemplary embodiment or embodiments described herein are not intended to limit the scope, applicability, or configuration of the claimed subject matter in any way. Rather, the foregoing detailed description will provide those skilled in the art with a convenient road map for implementing the described embodiment or embodiments. It should be understood that various changes can be made in the function and arrangement of elements without departing from the scope defined by the claims, which includes known equivalents and foreseeable equivalents at the time of filing this patent application. Accordingly, details of the exemplary embodiments or other limitations described above should not be read into the claims absent a clear intention to the contrary.

What is claimed is:

1. A garbage collection simulation model executed on a computer system having heap memory and a central processing unit (CPU), wherein the garbage collection simulation module performs an automated process comprising:

generating a plurality of transaction requests by the garbage collection simulation model, each of the plurality of transaction requests including randomly generated parameters representing a randomly generated transaction request inter-arrival time, a randomly generated transaction request execution time, and a randomly generated transaction request memory allocation amount;

allocating portions of the heap memory for use in an active request queue of the garbage collection simulation model to maintain one or more active transaction requests while the active transaction requests are awaiting processing by the CPU module, wherein, for each of the plurality of transaction requests, the garbage collection simulation model applies the transaction request to the active request queue if an amount of available heap memory is greater than the transaction request memory allocation amount;

in response to the garbage collection simulation model determining that the amount of available heap memory is less than the transaction request memory allocation amount, the garbage collection simulation model initiating a garbage collection routine that interrupts processing of the active transaction requests for a duration of the garbage collection routine, records a time to complete the garbage collection routine, and adds the time to complete the garbage collection routine to the randomly generated transaction request execution times for each of the active transaction requests in the active request queue to create modified transaction request execution times; and tracking, by the garbage collection simulation model, an average of the modified transaction request execution times to process the plurality of transaction requests in the heap memory, wherein the average of the transaction request execution times evaluates a performance of the garbage collection routine, wherein the garbage collection routine is tuned based upon the average of the modified transaction request execution times tracked by the garbage collection simulation module to thereby improve the performance of the garbage collection routine.

2. The simulation model of claim 1, wherein the central processing unit (CPU) is configured to process the active transaction requests received from the queue.

3. The simulation model of claim 2, wherein the CPU contains a plurality of processing cores, each configured to serially process a respective transaction request thread.

4. The simulation model of claim 1, wherein the transaction requests are generated at periodic rate equal to the inverse of the transaction request inter-arrival time.

5. The simulation model of claim 1, wherein the garbage collection module resumes processing of the interrupted transaction request upon completion of a garbage collection routine.

6. The simulation model of claim 1, wherein the transaction request inter-arrival time, the transaction request execution time, and the transaction request memory allocation amount are random variables modeled using probability distributions.

7. The simulation model of claim 1, wherein the transaction request inter-arrival time, the transaction request execution time, and the transaction request memory allocation amount are based on historical data.

8. The simulation model of claim 1, wherein the simulation model is further configured to mark as garbage the memory associated with a transaction request upon completion of processing the transaction request.

9. The simulation model of claim 1 configured for use in an on-demand, multitenant computing environment.

10. The simulation model of claim 1 implemented using computer code embodied in a non-transitory computer readable medium.

11. A process executed on a physical device having a processor and heap memory in the context of a virtual machine that models operation of a garbage collection routine, the process comprising the steps of:

generating, by the virtual machine, a plurality of requests each having randomly generated parameters comprising a randomly generated execution time of the request and a randomly generated memory allocation amount of the request;

for each of the generated requests, the virtual machine determining an amount of available heap memory and, in response to a determination that the amount of available heap memory is not less than the memory allocation amount, allocating a portion of the heap memory equal to the memory allocation amount to the request and adding the request to an active request pool, and otherwise interrupting each of the requests in the active request pool and initiating the garbage collection routine that frees allocated portions of the heap memory;

completing, by the virtual machine, each of the requests in the active request pool in the execution time of the active request while the garbage collection routine remains inactive; and in response to the garbage collection routine being initiated, the virtual machine:
identifying a garbage collection time associated with the interrupting garbage collection routine; and
adding the garbage collection time to the times to complete each of the requests in the active request pool; and tracking an average of the execution times to process each of the plurality of transaction requests in the active request pool to thereby evaluate a performance of the garbage collection routine, and wherein the garbage collection routine is tuned based upon the average of the modified transaction request execution times tracked by the garbage collection simulation module to thereby improve the performance of the garbage collection routine.

12. The process of claim 11, further comprising:
checking, in response to receiving and prior to determining, the state of a garbage collection (GC) routine.

13. The process of claim 12, further comprising:
waiting, if the garbage collection routine is active, until the active garbage collection routine is completed before determining; and
if the garbage collection routine is not active, determining the amount of available heap memory.

14. The process of claim 11, wherein adding the request to the active request pool comprises starting an execution clock associated with the request.

15. The process of claim 14, further comprising:
setting an execution clock for the request to the execution time if the request processing is not interrupted by the garbage collection; and
if processing the request is interrupted by the garbage collection routine, identifying a garbage collection time associated with the interrupting garbage collection routine; and
setting the execution clock for the request to a second time equal to the execution time plus the garbage collection time if the request processing is interrupted by the garbage collection routine.

16. The process of claim 11, further comprising:
   interrupting all active transaction request processing upon triggering a garbage collection routine.

\* \* \* \* \*